United States Patent
Liu et al.

(10) Patent No.: US 11,272,432 B2
(45) Date of Patent: Mar. 8, 2022

(54) SYSTEM MESSAGE BLOCK TRANSMISSION METHOD, BASE STATION AND USER EQUIPMENT

(71) Applicant: VIVO MOBILE COMMUNICATION CO., LTD., Guangdong (CN)

(72) Inventors: Siqi Liu, Chang'an Dongguan (CN); Yu Ding, Chang'an Dongguan (CN); Zichao Ji, Chang'an Dongguan (CN); Wei Bao, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/759,989

(22) PCT Filed: Oct. 19, 2018

(86) PCT No.: PCT/CN2018/111014
§ 371 (c)(1),
(2) Date: Apr. 28, 2020

(87) PCT Pub. No.: WO2019/085770
PCT Pub. Date: May 9, 2019

(65) Prior Publication Data
US 2021/0136663 A1    May 6, 2021

(30) Foreign Application Priority Data
Nov. 2, 2017   (CN) .......................... 201711064934.1

(51) Int. Cl.
*H04W 48/12*   (2009.01)
*H04W 48/16*   (2009.01)
(52) U.S. Cl.
CPC .......... *H04W 48/12* (2013.01); *H04W 48/16* (2013.01)

(58) Field of Classification Search
CPC ..... H04W 48/12; H04W 48/16; H04W 80/00; H04L 69/24
See application file for complete search history.

(56) References Cited

U.S. PATENT DOCUMENTS

2007/0049344 A1    3/2007   Van Der Velde et al.
2008/0102896 A1    5/2008   Wang et al.
(Continued)

FOREIGN PATENT DOCUMENTS

CN        1771745 A       5/2006
CN      101005693 A       7/2007
(Continued)

OTHER PUBLICATIONS

CN Office Action in Application No. 201711064934.1 dated Jan. 22, 2020.
(Continued)

*Primary Examiner* — Diane D Mizrahi
(74) *Attorney, Agent, or Firm* — Maschoff Brennan

(57) ABSTRACT

A system message block transmission method, a base station and a UE are provided. The system message block transmission method includes: generating a first system message block and transmitting the first system message block. The first system message block includes cell access related information and service indication information, the service indication information is used to indicate at least one of a service type supported by a cell and a new function of the first system message block, the service type includes a service type in a first protocol release or the service type includes a service type in the first protocol release and a service type in a second protocol release, the new function is related to the second protocol release, and the second protocol release is an evolution release of the first protocol release.

19 Claims, 7 Drawing Sheets

(56) References Cited

U.S. PATENT DOCUMENTS

| | | | |
|---|---|---|---|
| 2010/0272017 A1 | 10/2010 | Terry et al. | |
| 2013/0316720 A1* | 11/2013 | Dwyer | H04W 52/0206 |
| | | | 455/450 |
| 2014/0198685 A1 | 7/2014 | Xu et al. | |
| 2015/0223146 A1 | 8/2015 | Pinheiro et al. | |
| 2016/0205671 A1 | 7/2016 | Tabet et al. | |
| 2018/0034599 A1 | 2/2018 | Zhou et al. | |
| 2020/0314851 A1* | 10/2020 | Vaidya | H04L 1/0072 |

FOREIGN PATENT DOCUMENTS

| | | |
|---|---|---|
| CN | 101536560 A | 9/2009 |
| CN | 103945536 A | 7/2014 |
| CN | 106850165 A | 6/2017 |
| CN | 107211350 A | 9/2017 |
| WO | 2016/116145 A1 | 7/2016 |

OTHER PUBLICATIONS

EP Search Report in Application No. 18873386.9 dated Nov. 3, 2020.

* cited by examiner

SYSTEM MESSAGE BLOCK TRANSMISSION METHOD, BASE STATION AND USER EQUIPMENT

CROSS-REFERENCE TO RELATED APPLICATION

The present application is the U.S. national phase of PCT Application No. PCT/CN2018/111014 filed on Oct. 19, 2018, which claims a priority of the Chinese patent application No. 201711064934.1 filed on Nov. 2, 2017, which is incorporated herein by reference in its entirety.

TECHNICAL FIELD

The present disclosure relates to the field of communication technology, in particular to a system message block transmission method, a base station and a User Equipment (UE).

BACKGROUND

There are three typical application scenarios in a New Radio (NR) system, e.g., Enhanced Mobile Broadband (eMBB), Ultra Reliable & Low Latency Communication (URLLC) and Massive Machine Type of Communication (mMTC). In a communication system protocol, a certain release may probably focus on one application scenario, e.g., Release 15 (Rel-15) focuses on eMBB services, with URLLC services being discussed. However, along with the development of the communication technology, subsequent releases may probably provide new service types, e.g., Rel-16 may probably support mMTC services and the URLLC services. In the related art, a system message block is mainly designed with respect to a specific release, without taking forward compatibility in the communication system into consideration.

SUMMARY

In one aspect, the present disclosure provides in some embodiments an system message block transmission method for a base station, including: generating a first system message block, wherein the first system message block includes cell access related information and service indication information, the service indication information is used to indicate at least one of a service type supported by a cell and a new function of the first system message block, the service type includes a service type in a first protocol release or the service type includes a service type in the first protocol release and a service type in a second protocol release, the new function is related to the second protocol release, and the second protocol release is an evolution release of the first protocol release; and transmitting the first system message block.

In another aspect, the present disclosure provides in some embodiments an system message block transmission method for a UE, including: receiving a first system message block from a base station, the first system message block includes cell access related information and service indication information, the service indication information is used to indicate at least one of a service type supported by a cell and a new function of the first system message block, the service type includes a service type in a first protocol release or the service type includes a service type in the first protocol release and a service type in a second protocol release, the new function is related to the second protocol release, and the second protocol release is an evolution release of the first protocol release; and when the UE is a UE with the first protocol release, acquiring the cell access related information, and when the UE is a UE with the second protocol release, acquiring the service indication information.

In yet another aspect, the present disclosure provides in some embodiments a base station, including: a generation module configured to generate a first system message block, the first system message block includes cell access related information and service indication information, the service indication information is used to indicate at least one of a service type supported by a cell and a new function of the first system message block, the service type includes a service type in a first protocol release or the service type includes a service type in the first protocol release and a service type in a second protocol release, the new function is related to the second protocol release, and the second protocol release is an evolution release of the first protocol release; and a first transmission module configured to transmit the first system message block.

In still yet another aspect, the present disclosure provides in some embodiments a UE, including: a first reception module configured to receive a first system message block from a base station, the first system message block includes cell access related information and service indication information, the service indication information is used to indicate at least one of a service type supported by a cell and a new function of the first system message block, the service type includes a service type in a first protocol release or the service type includes a service type in the first protocol release and a service type in a second protocol release, the new function is related to the second protocol release, and the second protocol release is an evolution release of the first protocol release; and an acquisition module configured to, when the UE is a UE with the first protocol release, acquire the cell access related information, and when the UE is a UE with the second protocol release, acquire the service indication information.

In still yet another aspect, the present disclosure provides in some embodiments a base station, including a memory, a processor, and a computer program stored in the memory and executed by the processor. The processor is configured to execute the computer program so as to implement the above-mentioned system message block transmission method for the base station.

In still yet another aspect, the present disclosure provides in some embodiments a UE, including a memory, a processor, and a computer program stored in the memory and executed by the processor. The processor is configured to execute the computer program so as to implement the above-mentioned system message block transmission method for the UE.

In still yet another aspect, the present disclosure provides in some embodiments a computer-readable storage medium storing therein a computer program. The computer program is executed by a processor so as to implement the above-mentioned system message block transmission method for the base station or the above-mentioned system message block transmission method for the UE.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure. Such an expression "and/or" in the specification and the appended claims is used to represent that there is at least one of the objects before and after the expression.

Figure 1:
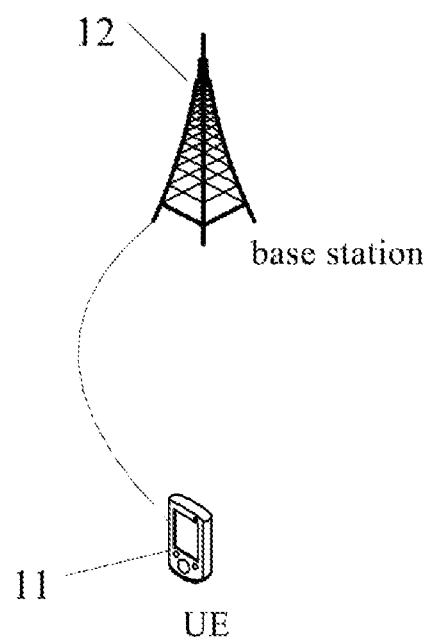
FIG. 1 is a schematic view showing an system message block transmission system according to one embodiment of the present disclosure.

As shown in FIG. 1, a system message block transmission system includes a UE 11 and a base station 12. The UE 11 may be a mobile phone, a table personal computer, a laptop computer, a Personal Digital Assistant (PDA), a Mobile Internet Device (MID) or a wearable device. It should be appreciated that, the type of the UE 11 will not be particularly defined herein. The base station 12 may be a base station or Node B (NB) in a $5^{th}$-Generation (5G) system or a future system (e.g., gNB, or 5G NR NB), or in the other communication system. It should be appreciated that, in the embodiments of the present disclosure, merely the 5G base station is taken as an example, but the type of the base station 12 will not be particularly defined herein.

It should be appreciated that, functions of the UE 11 and the base station 12 will be described hereinafter in conjunction with the embodiments.

Figure 2:
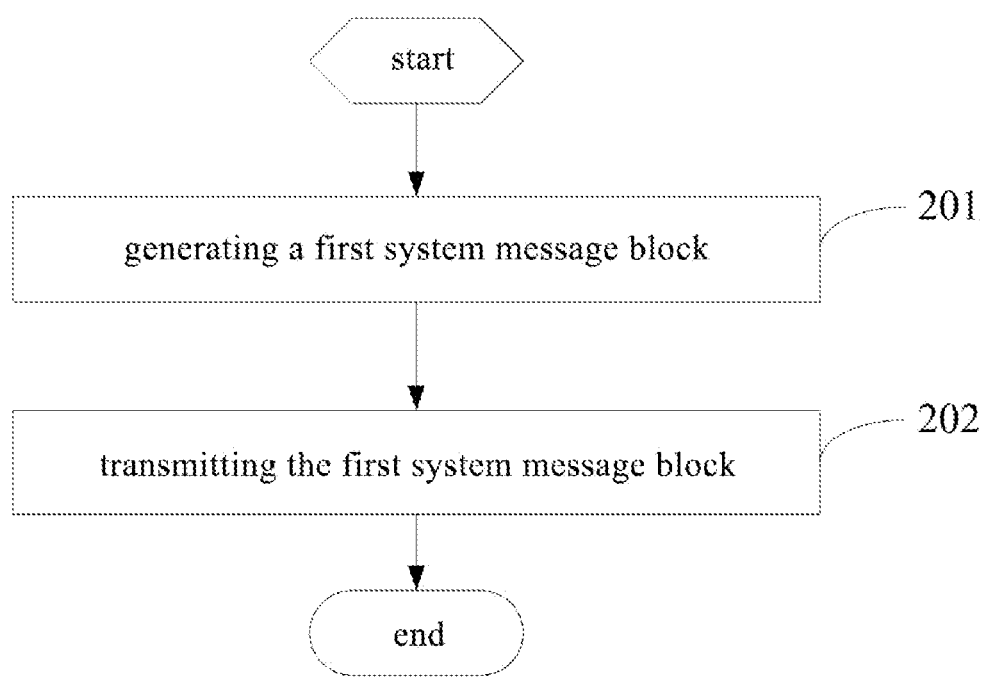
FIG. 2 is a flow chart of an system message block transmission method according to one embodiment of the present disclosure.

The present disclosure provides in some embodiments a system message block transmission method for a base station which, as shown in FIG. 2, includes the following steps.

Step 201: generating a first system message block. The first system message block may include cell access related information and service indication information, the service indication information may be used to indicate at least one of a service type supported by a cell and a new function of the first system message block, the service type may include a service type in a first protocol release or include a service type in the first protocol release and a service type in a second protocol release, the new function may be related to the second protocol release, and the second protocol release may be an evolution release of the first protocol release.

The cell access related information may be necessary information when a UE accesses the cell. For example, it may include at least one of a System Frame Number (SFN), a half frame indicator, a Synchronization Signal (SS) block time index, a cell barred indicator, indication information indicating a position of a first Demodulation Reference Signal (DMRS) for a Physical Downlink Shared Channel (PDSCH), a Physical Resource Block (PRB) grid offset, Downlink (DL) numerology indication information, and configuration information about a control resource set CORESET. The cell barred indicator may be used to indicate that the UE is allowed to access the cell or the cell is barred for the UE. The configuration information about the CORESET may include a time-frequency-domain position of the CORESET and timing configuration information about Remaining Minimum System Information (RMSI). The DL numerology indication information may include such parameters as subcarrier spacing, symbol length and Cyclic Prefix (CP) length.

In addition, when the second protocol release is the evolution release of the first protocol release, it means that the second protocol release is a subsequent release of the first protocol release (e.g., the first protocol release may be Rel-15 while the second protocol release may be Rel-16), which will not be particularly defined herein. For example, the first protocol release may be Rel-n while the second protocol release may be Rel-n+k, where n is an integer greater than or equal to 15 and k is an integer greater than or equal to 1. In addition, a service in the first protocol release may be a service supported in the first protocol release, e.g., an eMBB service in Rel-15, and a service in the second protocol release may be a new service supported in the second protocol release, e.g., an mMTC service in Rel-16.

The cell may be a current cell where the first system message block is being transmitted.

In addition, in the embodiments of the present disclosure, the new function of the first system message block may be understood as an improvement on a function of the first system message block, i.e., a modified or newly-added function for the system message block defined in the first protocol release. When the new function is related to the second protocol release, it means that there may be a specific relationship between the new function and the second protocol release, and the new function may include interpreting a parameter in the first system message block using an interpretation in the second protocol release. For example, a modified or newly-added interpretation may be provided for the indication information indicating the position of the first DMRS for the PDSCH, the PRB grid offset or the configuration information about the CORESET. To be specific, the indication information indicating the position of the first DMRS for the PDSCH, the PRB grid offset or the configuration information about the CORESET may be interpreted in two interpretation, i.e., the functions of the first system message block may be modified or added. In Step 201, the function of the first system message block may be the modified or newly-added function of the first system message block. Here, the modified or newly-added function may be applied to the second protocol release, so as to achieve the functions in the two protocol releases through one system message block, thereby to improve the forward compatibility in the communication system.

It should be appreciated that, in the embodiments of the present disclosure, when the service indication information is used to indicate the service type supported by the cell and/or the new function of the first system message block, it means that the service indication information may be used to indicate one or both of the two. When merely one of the two is indicated, the remaining one may be defined in a protocol or determined through negotiation between the base station and the UE.

In addition, in the embodiments of the present disclosure, the first system message block may be any system message block in system information. In a possible embodiment of the present disclosure, the first system message block may be a Master Information Block (MIB).

Step 202: transmitting the first system message block.

The first system message block may be transmitted through broadcast. Of course, a transmission mode will not be particularly defined herein, e.g., the first system message block may also be transmitted through Radio Resource Control (RRC) signaling or any other dedicated signaling.

In a possible embodiment of the present disclosure, the first system message block may be transmitted through a Synchronization Signal Block (SSB).

In the embodiments of the present disclosure, the first system message block may be designed with respect to the first protocol release and the second protocol release, so as to ensure the forward compatibility in the communication system. In addition, upon the receipt of the first system message block, the UE with different protocol releases may have different UE behaviors. For example, upon the receipt of the first system message block, the UE with the first protocol release may directly acquire information for the UE to access the cell, ignore the service indication information, determine whether to be allowed to access the cell based on the acquired information, perform cell reselected when the UE is not allowed to access the cell, and perform an access process when the UE is allowed to access the cell. Upon the receipt of the first system message block, the UE with the second protocol release may acquire the service indication information, and selectively acquire or not acquire the information for the UE to access the cell based on a service indicated by the service indication information.

It should be appreciated that, the above method may be applied to a 5G system. Of course, the method may also be applied to any other communication system, e.g., a $6^{th}$-Generation (6G) system, as along as the substantially same functions may be achieved.

According to the embodiments of the present disclosure, the first system message block including the cell access related information and the service indication information may be generated, the service indication information may be used to indicate at least one of the service type supported by the cell and the new function of the first system message block, the service type may include the service type in the first protocol release or include the service type in the first protocol release and the service type in the second protocol release, the new function may be related to the second protocol release, and the second protocol release may be an evolution release of the first protocol release. Then, the first system message block may be transmitted. As a result, it is able to ensure the forward compatibility of the first system message block in the communication system.

Figure 3:
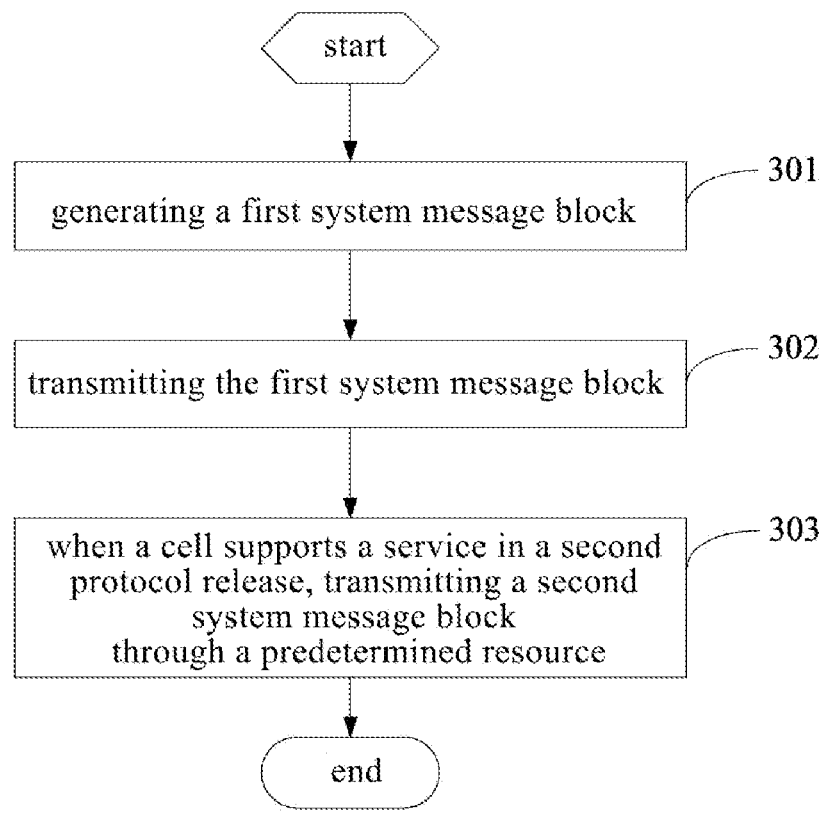
FIG. 3 is another flow chart of the system message block transmission method according to one embodiment of the present disclosure.

The present disclosure further provides in some embodiments a system message block transmission method for a base station which, as shown in FIG. 3, includes the following steps.

Step 301: generating a first system message block. The first system message block may include cell access related information and service indication information, the service indication information may be used to indicate at least one of a service type supported by a cell and a new function of the first system message block, the service type may include a service type in a first protocol release or include a service type in the first protocol release and a service type in a second protocol release, the new function may be related to the second protocol release, and the second protocol release may be an evolution release of the first protocol release.

The service indication information may be indicated through an unused bit in a system message block defined in the first protocol release, so that the first system message block may be used by the UE with the first protocol release and the UE with the second protocol release.

In a possible embodiment of the present disclosure, the service indication information may be used to indicate at least one of the service type and the new function through K bits, where K is an integer greater than or equal to 2; or the service indication information may be used to indicate the service type through N bits, or indicate the new function through M bits, or indicate the service type and the new function through N bits and M bits respectively, where the N bits may be different from the M bits, N is an integer greater than or equal to 1, and M is an integer greater than or equal to 1.

In the above first mode, it may be understood as that one or both of the service type and the new function is indicated through the same K bits, i.e., the K bits may be used to indicate three situations. For example, when K=2, 00 represents that merely an eMBB service is supported, 01 represents that both the eMBB service and an mMTC service are supported, 10 represents that there is the new function, and 11 represents that the eMBB service and the mMTC are supported. Through the joint indication using the same bits, it is able to reduce the signaling overhead.

In the above second mode, it may be understood as that the service type and the new function are indicated through different bits. For example, when N=1, 0 represents that merely the eMBB service is supported, and 1 represents that both the eMBB service and the mMTC service are supported. For another example, when M=1, 1 represents that there is the new function (e.g., a target parameter has been modified or newly-added), and 0 represents that there is no new function (e.g., the target parameter has not been modified or newly-added). For yet another example, two bits may be used, with a first bit being used to indicate the service type and a second bit being used to indicate the new function. In this mode, it is able to indicate the service type and the new function in a simple and clear manner through different bits. In addition, it should be appreciated that, N may be different from M. Of course, in some embodiments of the present disclosure, N and M may be the same.

In a possible embodiment of the present disclosure, the new function may include a new function of a target parameter in the cell access related information. The target parameter may include one or more of an SS block time index, a cell barred indicator, indication information about a position of a first DMRS for a PDSCH, a PRB grid offset, downlink numerology indication information, and configuration information about a CORESET.

The new function may be a function modified or newly-added on the basis of the target parameter of the system message block defined in the first protocol release. The modified function may be understood as a modified function of the target parameter, e.g., an interpretation of the indication information about the first DMRS for the PDSCH may be modified. To be specific, the indication information about the position of the first DMRS for the PDSCH in the system message block defined in the first protocol release is originally interpreted as a third or fourth symbol position in a slot, and now it may be interpreted as a first or second symbol position in the slot. The newly-added function may be understood as a newly-added function in the system message block defined in the first protocol release other than the known functions. For example, the PRB grid offset in the system message block defined in the first protocol release is originally interpreted as a first offset position, and now another paring mode may be newly added for the PRB grid offset and the PRB grid offset may be interpreted as a second offset position, i.e., there exist two interpretation for the first system message block in which the PRB grid offset may be interpreted as the first offset position and the second offset position respectively.

In addition, in the embodiments of the present disclosure, the service indication information may be used to indicate the new function of the target parameter, i.e., the modified or newly-added function on the basis of the target parameter of the system message block defined in the first protocol release. For example, the target parameter may be used in the first protocol release and the second protocol release. In this case, the target parameter may be interpreted in the two interpretation, i.e., the two interpretation may be used concurrently. For another example, the target parameter may be used in the second protocol release, and in this case, the target parameter may be allowed to be interpreted through the second protocol release, i.e., the two interpretation may not be used concurrently. Alternatively, the service indication information may be used to indicate that there is a new function for the target parameter, and the specific function may be defined in a protocol or preconfigured for the UE.

In the embodiments of the present disclosure, it is able to provide the modified or newly-added function on the basis of the system message block defined in the first protocol release, and enable the first system message block to be compatible with the first protocol release and the second protocol release, thereby to ensure the forward compatibility in the communication system.

In a possible embodiment of the present disclosure, the new function of the target parameter may include a function where the target parameter is used in both the first protocol release and the second protocol release, or a function where the target parameter is used in the second protocol release.

When the target parameter is used in both the first protocol release and the second protocol release, it means that the target parameter may be interpreted both in the interpretation for the first protocol release and in the interpretation for the second protocol release, and interpreting results may not conflict with each other.

When the target parameter is used in the second protocol release, it means that the interpreting results may conflict with each other when the target parameter is interpreted through in the interpretation for the first protocol release and in the interpretation for the second protocol release. Hence, the UE with the second protocol release is allowed to interpret the target parameter in the interpretation for the second protocol release. However, the base station will not be particularly defined herein.

Upon the receipt of the first system message block, when the target parameter is used in both the first protocol release and the second protocol release, the UE with the second protocol release may acquire the target parameter, interpret the target parameter in the interpretation for the second protocol release, and perform a corresponding operation based on the interpreting result. When the target parameter is used in the second protocol release, the UE with the second protocol release may ignore the cell barred indicator in the first system message block, acquire the target parameter, interpret the target parameter in the interpretation for the second protocol release, acquire RMSI based on the interpreting result, and determine whether the UE is allowed to access the cell based on the cell barred indicator in the RMSI.

In the case that the target parameter is used in both the first protocol release and the second protocol release, no matter whether the target parameter includes the cell barred indicator, the UE with the second protocol release may determine whether the UE is allowed to access the cell based on the cell barred indicator in the first system message block.

In the embodiments of the present disclosure, there are two circumstances for the target parameter. In one circumstance, the two interpretation may be used concurrently, and the target parameter may be adapted to the UE with the first protocol release and the UE with the second protocol release. In the other circumstance, the two interpretation may not be used concurrently, and the target parameter may be adapted to the UE with the second protocol release.

In addition, when the service indication information indicates the new function, the service indication information may be used to indicate that there is the new function for the target parameter, e.g., indicate that the target parameter has been overwritten; or the service indication information may be used to indicate a specific function of the target parameter, e.g., indicate that the target parameter may be used in both the first protocol release and the second protocol release or merely used in the second protocol release.

It should be appreciated that, in the embodiments of the present disclosure, the new function of the target parameter may be defined in a protocol, and in this case, the service indication information may be used to indicate behaviors of the UE when the target parameter is used in the first protocol release and the second protocol release or used in merely the second protocol release. For example, when the target parameter is used in the first protocol release and the second protocol release, the service indication information may be used to indicate the following behaviors of the UE: the UE with the first protocol release may interpret the target parameter in the interpretation for the first protocol release and perform the corresponding operation based on the interpreting result, e.g., determine whether the UE is allowed to access the cell based on the cell barred indicator in the first system message block and search for the CORESET based on the configuration information about the CORESET; and the UE with the second protocol release may interpret the target parameter in the interpretation for the second protocol release, and perform the corresponding operation based on the interpreting result, e.g., determine whether the UE is allowed to access the cell based on the cell barred indicator in the first system message block and search for the CORESET based on the configuration information about the CORESET.

In a possible embodiment of the present disclosure, the cell access related information may include the cell barred indicator. When the target parameter is used in the second protocol release, the cell barred indicator may be used to indicate that the UE is not allowed to access the cell. At this time, the UE with the second protocol release may ignore the cell barred indicator in the first system message block, interpret the target parameter in the interpretation for the second protocol release, acquire the RMSI based on the interpreting result, and determine whether the UE is allowed to access the cell based on the cell barred indicator in the RMSI. To be specific, the UE with the second protocol release may interpret resources, search the CORESET in the corresponding resources based on the interpreting result, receive the RMSI based on a Downlink Control Information (DCI) scheduling indicator searched in the CORESET, and determine whether the UE is allowed to access the cell based on the cell barred indicator in the RMSI.

The UE with the first protocol release may determine that the UE is not allowed to access the cell based on the cell barred indicator, and perform the cell reselection.

In the embodiments of the present disclosure, when the target parameter is used in the second protocol release, the cell barred indicator may be used to indicate that the UE is not allowed to access the cell.

For example, the service indication information may have two bits, where 00 represents that merely the eMBB service is supported, 01 represents that both the eMBB service and the mMTC service are supported, and 10 represents that the configuration information about the CORESET is to be overwritten.

The base station may broadcast the SSB carrying a first MIB. A cell barred indicator in the first MIB may be set as to allow the UE to access the cell, and the service indication information may be 01. One Rel-16 UE (e.g., an mMTC user) may receive the SSB, interpret the first MIB to determine that the mMTC service is supported by the cell, read a second MIB for the mMTC service from a predetermined resource, and perform the subsequent cell access operation. One Rel-15 UE may receive the SSB, interpret the first MIB, ignore the service indication information, read the cell barred indicator to determine that the UE is allowed to access the cell, and perform the subsequent cell access operation.

For another example, the service indication information may have two bits, where 00 represents that merely the eMBB service is supported, 01 represents that the eMBB service and the mMTC service are supported, and 10 represents that the configuration information about the CORESET is to be overwritten.

The base station may broadcast the SSB carrying the first MIB. The cell barred indicator in the first MIB may be set as to allow the UE to access the cell, and the service indication information may be 00. The Rel-16 UE (e.g., the mMTC user) may receive the SSB, interpret MIBs in a pool to determine that the mMTC service is not supported by the cell, and perform the cell reselection.

Of course, the new function of the target parameter may also not be defined in a protocol, but indicated through the service indication information. The UE and the base station may perform the corresponding operation based on the new function indicated in the service indication information. In this regard, it is able to indicate the new function more flexibly, thereby to improve the system flexibility and meet the requirements on more services or scenarios.

In a possible embodiment of the present disclosure, subsequent to transmitting the first system message block, the system message block transmission method may further include: when the target parameter is used in the first protocol release and the second protocol release, performing a corresponding operation based on the interpreting result acquired through interpreting the target parameter in the interpretation for the first protocol release, and/or performing a corresponding operation based on the interpreting result acquired through interpreting the target parameter in the interpretation for the second protocol release; or when the target parameter is used in the second protocol release, performing a corresponding operation based on the interpreting result acquired through interpreting the target parameter in the interpretation for the second protocol release; or when the target parameter is used in the second protocol release, performing a corresponding operation based on the interpreting result acquired through interpreting the target parameter in the interpretation for the second protocol release and performing a corresponding operation based on the interpreting result acquired through interpreting the target parameter in the interpretation for the first protocol release.

The performing the corresponding operation based on the interpreting result acquired through interpreting the target parameter in the interpretation for the first protocol release may include acquiring the interpreting result through interpreting the target parameter in the interpretation for the first protocol release, and performing the corresponding operation based on the interpreting result. For example, the base station may indicate there most-significant bits of the SS block time index in the transmitted SS block, and the UE may determine the three most-significant bits of the SS block time index in the detected SS block. The base station may transmit a DMRS at a position corresponding to the indication information about the position of the first DMRS for the PDSCH, and the UE may receive the DRMS at the position corresponding to the indication information about the position of the first DMRS for the PDSCH and determine whether a maximum time-domain span of the CORESET is two or three symbols. The base station may indicate an offset between an SSB frequency-domain boundary and a data PRB frequency-domain boundary through the PRB grid offset, and the UE may determine the offset between the SSB frequency-domain boundary and the data PRB frequency-domain boundary based on the PRB grid offset and deduce a corresponding data PRB index. The base station may indicate the RMSI/broadcast Open System Interconnect (OSI)/a subcarrier spacing (SCS) of each of msg2 and msg4 for initial access through the downlink numerology indication information, and the UE may determine the RMSI/the broadcast OSI/the SCS of each of msg2 and msg4 for the initial access based on the downlink numerology indication information. The base station may transmit the CORESET on a resource corresponding to the configuration information about the CORESET, and the UE may search for the CORESET on the resource corresponding to the configuration information about the CORESET. The performing the corresponding operation based on the interpreting result acquired through interpreting the target parameter in the interpretation for the second protocol release may include acquiring the interpreting result through interpreting the target parameter in the interpretation for the second protocol release, and performing the corresponding operation based on the interpreting result. Here, the operation may refer to the corresponding description in the first protocol release, and thus will not be particularly defined herein.

In the embodiments of the present disclosure, the base station may perform different operations based on whether the interpretation for the configuration information are used concurrently or not used concurrently, so as to meet the requirements of different UEs.

The following description will be given when the target parameter is used in the first protocol release and the second protocol release and the target parameter includes the configuration information about the CORESET.

It is presumed that the configuration information about the CORESET in the first MIB is re-defined in Rel-16, and the service indication information has two bits, where 00 represents that merely the eMBB service is supported, 01 represents that the eMBB service and the mMTC service are supported, and 10 represents that the configuration information about the CORESET is to be overwritten. The configuration information about the CORESET may be used in Rel-15 and Rel-16. For example, in Rel-15, when the configuration information about the CORESET is 0001, it means that a frequency domain of the CORESET is 48 RB, a center of the frequency domain of the CORESET may be aligned with the center of a frequency domain of the SSB, and a time domain of the CORESET is located at a symbol 0 in a slot where the SSB is located. In Rel-16, when the configuration information about the CORESET is 0001, it means that the frequency domain of the CORESET is 48 RB, the center of the frequency domain of the CORESET may be aligned with the center of the frequency domain of the SSB, and the time domain of the CORESET is located at a symbol 1 in the slot where the SSB is located.

The base station may broadcast the SSB carrying the first MIB, and the cell barred indicator in the first MIB may be set so as to allow the UE to access the cell. The service indication information may indicate 10, the configuration information about the CORESET in the first MIB may indicate 0001, and the base station may transmit two CORESETs each at the frequency domain of 48 RBs and with a time span of one OFDM symbol on the symbols 0 and 1 respectively in the slot where the SSB is located. The configuration information about the CORESET may be used in Rel-15 and Rel-16. One Rel-16 UE may receive the SSB, interpret the first MIB to acquire the service indication information, and determine that the configuration information about the CORESET needs to be overwritten. The UE may interpret the configuration information about the CORESET in the first MIB based on Rel-16, search for the CORESET on the symbol 1 in the slot where the SSB is located based on the interpreting result, and perform the subsequent cell access process. One Rel-15 UE may receive the SSB, interpret the first MIB, interpret the configuration information about the CORESET in the first MIB based on Rel-15, search for the CORESET on the symbol 0 in the slot where the SSB is located based on the interpreting result, and perform the subsequent access process.

It should be appreciated that, the service indication information may be used to indicate the interpretation for the second protocol release, and there may exist the following two types of the interpretation for the second protocol release.

In a first type, the UE with the second protocol release may interpret the target parameter based on a interpreting mapping (e.g., a interpreting table) in the first protocol release, and the service indication information may be used to indicate an index in the interpreting relationship in the first protocol release. The UE with the second protocol release may directly take a interpreting result of the index in the paring mapping in the first protocol release as the interpreting result of the first system message block. In this regard, it is able to reduce the modification at the UE as possible, thereby to reduce the implementation cost.

For example, it is presumed that the configuration information about the CORESET in the first MIB is re-defined in Rel-16, and the service indication information has six bits. Two bits may be used to indicate the supported service type. For instance, 00 represents that merely the eMBB service is supported, 01 represents that the eMBB service and the mMTC service are supported, and 10 represents that the eMBB service and the URLLC service are supported. The other four bits may be used to indicate that the configuration information about the CORESET is to be overwritten (which, for convenience, is called as CORESET configuration overwriting information), so as to indicate how to overwrite the interpreting result of the configuration information about the CORESET carried in the first MIB in Rel-16. There may exist various design modes for the interpreting result in Rel-16. In one design mode, the configuration information about the CORESET carried in the current first MIB may be overwritten using the configuration information about the CORESET in Rel-15 corresponding to the CORESET configuration overwriting information. It is presumed that the configuration information about the CORESET may be used in Rel-15 and Rel-16. For example, in Rel-15, when the configuration information about the CORESET is 0001, it means that the frequency domain of the CORESET may be 48 RB, the center of the frequency domain of the CORESET may be aligned with the center of the frequency domain of the SSB, and the time domain of the CORESET may be located at the symbol 0 in the slot where the SSB is located. When the configuration information about the CORESET is 0000, it means that the frequency domain of the CORESET may be 48 RB, the center of the frequency domain of the CORESET may be aligned with the center of the frequency domain of the SSB, and the time domain of the CORESET may be located at the symbol 1 in the slot where the SSB is located. When the configuration information about the CORESET carried in the first MIB is 0001 and the four bits indicating the CORESET configuration overwriting information are 0000, a interpreting result of the CORESET configuration overwriting information in Rel-16 represents that the interpreting result in Rel-15 acquired when the configuration information about the CORESET in the first MIB is 0001 may be overwritten with the interpreting result in Rel-15 acquired when the configuration information about the CORESET is 0000. Similarly, when the four bits indicating the CORESET configuration overwriting information are 0010, 0011 . . . , the interpreting result in Rel-16 represents that the interpreting result of the configuration information about the CORESET configuration in the first MIB in Rel-15 may be overwritten with the interpreting result in Rel-15 when the configuration information about the CORESET is 0010, 0011 . . . respectively.

The base station may broadcast the SSB carrying the first MIB, and the cell barred indicator in the first MIB may be set as to allow the UE to access the cell. The four bits indicating the CORESET configuration overwriting information in the service indication information may be 0000, the configuration information about the CORESET in the first MIB may be 0001, and the base station may transmit two CORESETs each at a frequency domain of 48 RB and having a time-domain span of one OFDM symbol on the symbols 0 and 1 respective in the slot where the SSB is located. The configuration information about the CORESET may be used in Rel-15 and Rel-16. One Rel-16 UE may receive the SSB, interpret the first MIB to acquire the service indication information, determine that the configuration information about the CORESET needs to be overwritten, overwrite the configuration information about the CORESET in the first MIB with the interpreting result of 0000 in Rel-15, search for the CORESET on the symbol 1 in the slot where the SSB is located based on the interpreting result, and perform the subsequent cell access process. One Rel-15 UE may receive the SSB, interpret the first MIB, take the interpreting result of 0001 in Rel-15 as the configuration information about the CORESET in the first MIB, search for the CORESET on the symbol 0 in the slot there where SSB is located based on the interpreting result, and perform the subsequent cell access process.

In a second type, the UE with the second protocol release may interpret the target parameter based on a interpreting mapping (e.g., a interpreting table) in the second protocol release. In the embodiments of the present disclosure, different interpreting mappings may be configured for different protocol releases.

For example, it is presumed that the configuration information about the CORESET in the first MIB is re-defined in Rel-16, and the service indication information has six bits. Two bits may be used to indicate the supported service type. For instance, 00 represents that merely the eMBB service is supported, 01 represents that the eMBB service and the mMTC service are supported, and 10 represents that the eMBB service and the URLLC service are supported. The other four bits may be used to indicate that the configuration information about the CORESET is to be overwritten (which, for convenience, is called as CORESET configuration overwriting information), so as to indicate how to overwrite the interpreting result of the configuration information about the CORESET carried in the first MIB in Rel-16. There may exist various design modes for the interpreting result in Rel-16. In one design mode, the configuration information about the CORESET carried in the current first MIB may be overwritten using the configuration information about the CORESET in Rel-16 corresponding to the CORESET configuration overwriting information. It is presumed that the configuration information about the CORESET may be used in Rel-15 and Rel-16. For example, in Rel-15, when the configuration information about the CORESET is 0001, it means that the frequency domain of the CORESET may be 48 RB, a center of the frequency domain of the CORESET may be aligned with a center of the frequency domain of the SSB, and the time domain of the CORESET may be located at the symbol 0 in the slot where the SSB is located. When the configuration information about the CORESET is 0000, it means that the frequency domain of the CORESET may be 48 RB, the center of the frequency domain of the CORESET may be aligned with the center of the frequency domain of the SSB, and the time domain of the CORESET may be located at the symbol 1 in the slot where the SSB is located. When the configuration information about the CORESET carried in the first MIB is 0001 and the four bits indicating the CORESET configuration overwriting information are 0000, a interpreting result of the CORESET configuration overwriting information in Rel-16 represents that the interpreting result in Rel-15 acquired when the configuration information about the CORESET in the first MIB is 0001 may be overwritten with the interpreting result in Rel-16 acquired when the configuration information about the CORESET is 0000. When the configuration information about the CORESET in Rel-16 is 0000, it means that the frequency domain of the CORESET may be 48 RB, the center of the frequency domain of the CORESET may be aligned with the center of the frequency domain of the SSB, and the time domain of the CORESET may be located at the symbol 2 in the slot where the SSB is located. Similarly, when the four bits indicating the CORESET configuration overwriting information are 0010, 0011 . . . , the interpreting result in Rel-16 represents that the interpreting result of the configuration information about the CORESET configuration in the first MIB in Rel-15 may be overwritten with the interpreting result in Rel-16 when the configuration information about the CORESET is 0010, 0011 . . . respectively.

The base station may broadcast the SSB carrying the first MIB, and the cell barred indicator in the first MIB may be set as to allow the UE to access the cell. The four bits indicating the CORESET configuration overwriting information in the service indication information may be 0000, the configuration information about the CORESET in the first MIB may be 0001, and the base station may transmit two CORESETs each at a frequency domain of 48 RB and having a time-domain span of one OFDM symbol on the symbols 0 and 1 respective in the slot where the SSB is located. One Rel-16 UE may receive the SSB, interpret the first MIB to acquire the service indication information, determine that the configuration information about the CORESET needs to be overwritten, interpret the overwritten configuration information about the CORESET in the first MIB based on 0000 in Rel-16, search for the CORESET on the symbol 2 in the slot where the SSB is located based on the interpreting result, and perform the subsequent cell access process. One Rel-15 UE may receive the SSB, interpret the first MIB, interpret the configuration information about the CORESET in the first MIB based on 0001 in Rel-15, search for the CORESET on the symbol 0 in the slot there where SSB is located based on the interpreting result, and perform the subsequent cell access process.

The following description will be given when the target parameter is used in the second protocol release.

It is presumed that the configuration information about the CORESET in the first MIB is re-defined in Rel-16, and the service indication information has two bits, where 00 represents that merely the eMBB service is supported, 01 represents that the eMBB service and the mMTC service are supported, and 10 represents that the configuration information about the CORESET is to be overwritten. The target parameter may be used for Rel-16. For example, in Rel-15, when the configuration information about the CORESET is 0001, it means that the frequency domain of the CORESET may be 24 RB, the center of the frequency domain of the CORESET may be aligned with the center of the frequency domain of the SSB, and the CORESET may be located at the symbols 0 and 1 in the slot where the SSB is located. In Rel-16, when the configuration information about the CORESET is 0001, it means that the frequency domain of the CORESET may be 24 RB, the center of the frequency domain of the CORESET may be aligned with the center of the frequency domain of the SSB, and the CORESET may be located at the symbols 1 and 2 in the slot where the SSB is located. In the first MIB, the cell barred indicator may be set as to prohibit the UE from accessing the cell.

The base station may broadcast the SSB carrying the first MIB, the cell barred indicator in the first MIB may be set so as to prohibit the UE from accessing the cell, and the cell barred indicator in the RMSI may be set as to allow the UE to access the cell. The service indication information may indicate 10, and the configuration information about the CORESET in the first MIB may indicate 0001. One Rel-16 UE may receive the SSB, interpret the first MIB, ignore the cell barred indicator in the first MIB, acquire the service indication information, and determine that the configuration information about the CORESET needs to be overwritten. The UE may interpret the configuration information about the CORESET in the first MIB based on Rel-16, search for the CORESET on the symbols 1 and 2 in the slot where the SSB is located based on the interpreting result, receive the RMSI based on a DCI scheduling indicator searched in the CORESET, and determine that the UE is allowed to access the cell based on the cell barred indicator in the RMSI. One Rel-15 UE may receive the SSB, interpret the first MIB, determine that the cell barred indicator in the first MIB is set as to prohibit the UE from accessing the cell, and perform the cell reselection.

Step 302: transmitting the first MIB.

Step 303: when the cell supports a service in the second protocol release, transmitting a second MIB through a predetermined resource. At least a part of parameters in the second system message block may be different from those in the first system message block, and the second system message block may include access related information about the service in the second protocol release.

The predetermined resource may be defined in a protocol, or determined by the base station and the UE in advance through negotiation. In addition, when at least a part of parameters in the second system message block are different from those in the first system message block, all the parameters of the two system message blocks may be different, or parts of the parameters may be the same.

The access related information may be relevant information when the UE has accessed the cell for the service in the second protocol release, e.g., a part of minimum system information necessary for the UE to access the cell for the service in the second protocol release, and the other part of the minimum system information may be carried in the first system message block. In this way, it is able to transmit the service indication information to the UE through the first system message block, so as to help the UE to quickly acquire the service type supported by the cell. In addition, it is able to indicate the UE to perform the subsequent operation in combination with the parameters in the second system message block, and ensure the forward compatibility.

For example, in the case that the service indication information is at least used to indicate the service types supported by the cell, upon the acquisition of the service indication information, the UE with the second protocol release may perform the cell reselected if the service types do not include an expected service type, or receive the second system message block through the predetermined resource if the service type includes the expected service type and there is the second system message block in the expected service type. Whether there is the second system message block in the expected service type may be determined by the UE through pre-configuration or definition in a protocol, or configured by the base station for the UE. The expected service type may be a service type expected and supported by the UE.

It should be appreciated that, in the embodiments of the present disclosure, an order of Steps 302 and 303 will not be particularly defined herein. Step 302 may be performed prior to, subsequent to or simultaneously with, Step 303. In the drawings, Step 302 is performed prior to Step 303. In addition, such words as "first" and "second" in the expressions "first system message block" and "second system message block" are used to differentiate the two system message blocks from each other, but shall not be construed as limiting the system message blocks. For example, the first system message block may also be called as level-one system message block, and the second system message block may also be called level-two system message block. In a possible embodiment of the present disclosure, each of the first system message block and the second system message block may be an MIB.

According to the embodiments of the present disclosure, on the basis of the method in FIG. 1, the second system message block may be transmitted additionally. As a result, it is able to, on one hand, transmit the service indication information to the UE through the first system message block so as to help the UE to quickly acquire the service type supported by the cell, and on the other hand, indicate the UE to perform the subsequent operation in combination with the parameters in the second system message block so as to ensure the forward compatibility.

Figure 4:
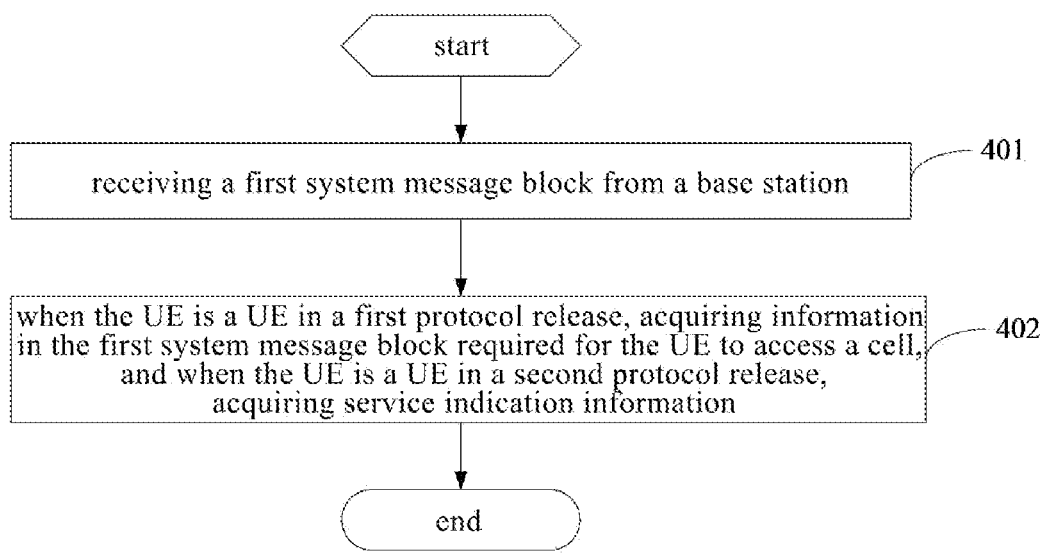
FIG. 4 is yet another flow chart of an system message block transmission method according to one embodiment of the present disclosure.

The present disclosure further provides in some embodiments an system message block transmission method for a UE which, as shown in FIG. 4, includes: Step 401 of receiving a first system message block from a base station, the first system message block including cell access related information and service indication information, the service indication information being used to indicate at least one of a service type supported by a cell and a new function of the first system message block, the service type including a service type in a first protocol release or including a service type in the first protocol release and a service type in a second protocol release, the new function being related to the second protocol release, and the second protocol release being an evolution release of the first protocol release; and Step 402 of, when the UE is a UE with the first protocol release, acquiring the cell access related information, and when the UE is a UE with the second protocol release, acquiring the service indication information.

Probably, the acquiring the service indication information when the UE is a UE with the second protocol release may include: acquiring, by the UE with the second protocol release, merely the service indication information. In other words, apart from the service indication information, the UE with the second protocol release may acquire the other information, e.g., access related information about at least a part of the cells. In a possible embodiment of the present disclosure, the access related information about all the cells carried in the first system message block may be acquired. The acquired information will not be particularly defined herein.

In a possible embodiment of the present disclosure, the new function may include a new function of a target parameter in the cell access related information. The target parameter may include one or more of an SS block time index, a cell barred indicator, indication information about a position of a first DMRS for a PDSCH, a PRB grid offset, downlink numerology indication information, and configuration information about a CORESET.

In a possible embodiment of the present disclosure, the new function of the target parameter may include a function where the target parameter is used in both the first protocol release and the second protocol release, or a function where the target parameter is used in the second protocol release.

In a possible embodiment of the present disclosure, the UE is a UE with the second protocol release. Subsequent to acquiring the service indication information, the system message block transmission method may further include: when the target parameter is used in both the first protocol release and the second protocol release, acquiring the target parameter, interpreting the target parameter in an interpretation in the second protocol release, and performing a corresponding operation based on a interpreting result; and when the target parameter is used in the second protocol release, ignoring the cell barred indicator in the first system message block, acquiring the target parameter, interpreting the target parameter in the interpretation in the second protocol release, acquiring RMSI based on the interpreting result, and determining whether the UE is allowed to access the cell based on the cell barred indicator in the RMSI.

In a possible embodiment of the present disclosure, the service indication information may be at least used to indicate service types supported by the cell, and the UE may be a UE with the second protocol release. Subsequent to acquiring the service indication information, the system message block transmission method may further include: when the service types do not include a service type expected by the UE, performing cell reselection; or when the service types include the service type expected by the UE and there is a second system message block in the service type expected by the UE, receiving the second system message block through a predetermined resource. At least a part of parameters of the second system message block may be different from those in the first system message block, and the second system message block may include access related information about a service in the second protocol release.

In a possible embodiment of the present disclosure, the service indication information may be used to indicate at least one of the service type and the new function through K bits, where K is an integer greater than or equal to 2; or the service indication information may be used to indicate the service type through N bits, or indicate the new function through M bits, or indicate the service type and the new function through N bits and M bits respectively, where the N bits may be different from the M bits, N is an integer greater than or equal to 1, and M is an integer greater than or equal to 1.

It should be appreciated that, the implementation of the system message block transmission method for the UE may refer to the relevant description about the UE in the system message block transmission method in FIGS. 2 and 3 with a same beneficial effect, which will not be particularly defined herein.

Figure 5:
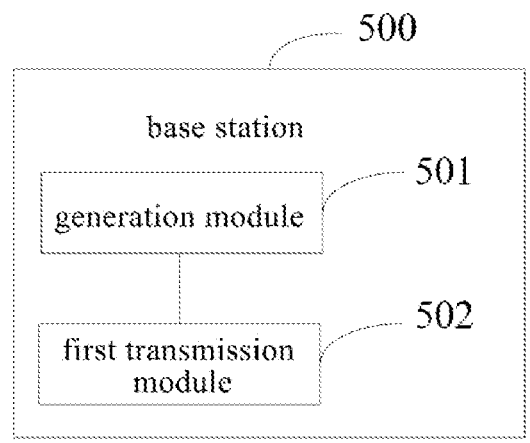
FIG. 5 is a schematic view showing a base station according to one embodiment of the present disclosure.

The present disclosure further provides in some embodiments a base station 500 which, as shown in FIG. 5, includes: a generation module 501 configured to generate a first system message block, the first system message block including cell access related information and service indication information, the service indication information being used to indicate at least one of a service type supported by a cell and a new function of the first system message block, the service type including a service type in a first protocol release or including a service type in the first protocol release and a service type in a second protocol release, the new function being related to the second protocol release, and the second protocol release being an evolution release of the first protocol release; and a first transmission module 502 configured to transmit the first system message block.

Figure 6:
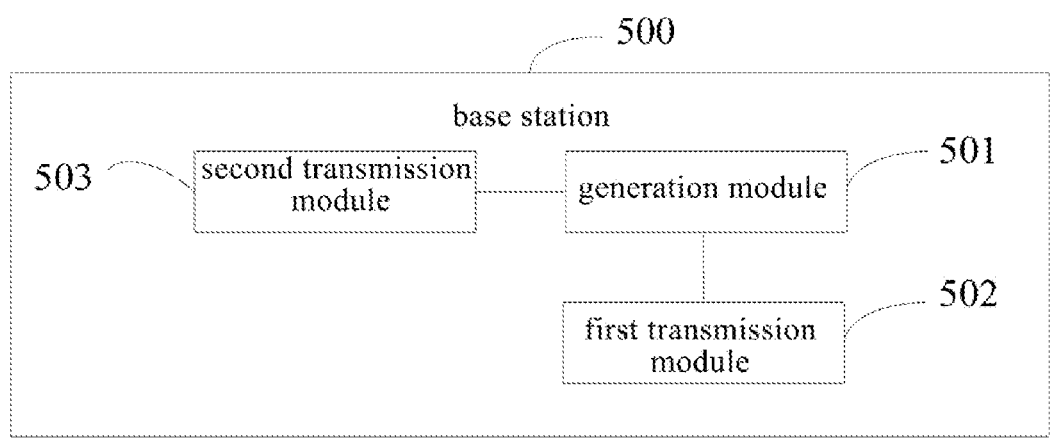
FIG. 6 is another schematic view showing the base station according to one embodiment of the present disclosure.

In a possible embodiment of the present disclosure, as shown in FIG. 6, the base station 500 may further include a second transmission module 503 configured to, when the cell supports a service in the second protocol release, transmit a second system message block through a predetermined resource. At least a part of parameters of the second system message block are different from those in the first system message block, and the second system message block may include access related information about the service in the second protocol release.

In a possible embodiment of the present disclosure, the new function may include a new function of a target parameter in the cell access related information. The target parameter may include one or more of an SS block time index, a cell barred indicator, indication information about a position of a first DMRS for a PDSCH, a PRB grid offset, downlink numerology indication information, and configuration information about a CORESET.

In a possible embodiment of the present disclosure, the new function of the target parameter may include a function where the target parameter is used in both the first protocol release and the second protocol release, or a function where the target parameter is used in the second protocol release.

Figure 7:
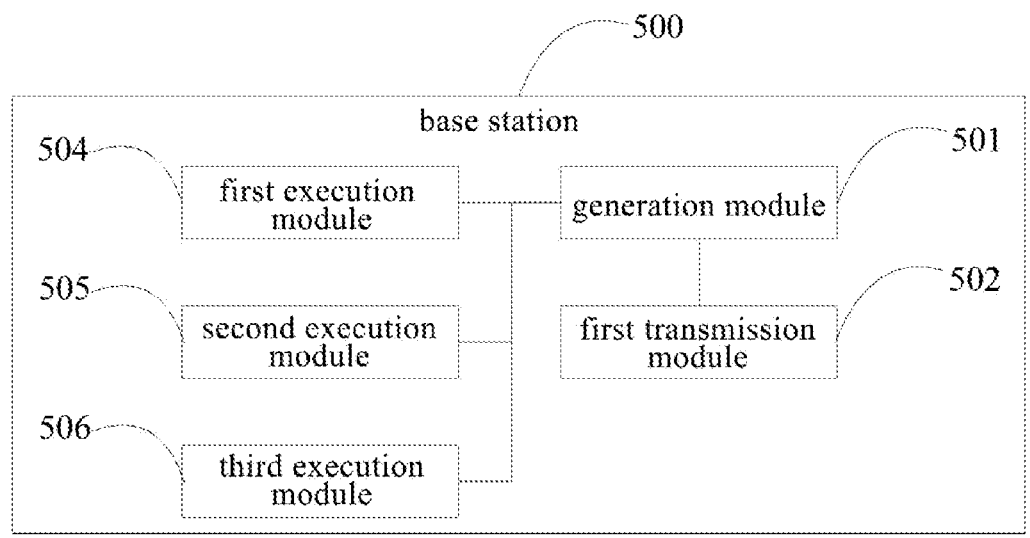
FIG. 7 is yet another schematic view showing the base station according to one embodiment of the present disclosure.

In a possible embodiment of the present disclosure, as shown in FIG. 7, the base station 500 may further include: a first execution module 504 configured to, when the target parameter is used in both the first protocol release and the second protocol release, perform a corresponding operation based on a interpreting result acquired through interpreting the target parameter in an interpretation in the first protocol release, and/or perform a corresponding operation based on a interpreting result acquired through interpreting the target parameter in an interpretation in the second protocol release; a second execution module 505 configured to, when the target parameter is used in the second protocol release, perform the corresponding operation based on the interpreting result acquired through interpreting the target parameter in the interpretation in the second protocol release; or a third execution module 506 configured to, when the target parameter is used in the second protocol release, perform the corresponding operation based on the interpreting result acquired through interpreting the target parameter in the interpretation in the second protocol release, and perform the corresponding operation based on the interpreting result acquired through interpreting the target parameter in the interpretation in the first protocol release.

In a possible embodiment of the present disclosure, the cell access related information may include the cell barred indicator, and when the target parameter is used in the second protocol release, the cell barred indicator may be used to indicate that the cell is barred for a User Equipment (UE).

In a possible embodiment of the present disclosure, the service indication information may be used to indicate at least one of the service type and the new function through K bits, where K is an integer greater than or equal to 2; or the service indication information may be used to indicate the service type through N bits, or indicate the new function through M bits, or indicate the service type and the new function through N bits and M bits respectively, where the N bits may be different from the M bits, N is an integer greater than or equal to 1, and M is an integer greater than or equal to 1.

The base station in the embodiments of the present disclosure is capable of implementing the procedures in the system message block transmission method for the base station in FIGS. 2-3, which will not be particularly defined herein. According to the base station in the embodiments of the present disclosure, it is able to ensure the forward compatibility of the first system message block in the communication system.

Figure 8:
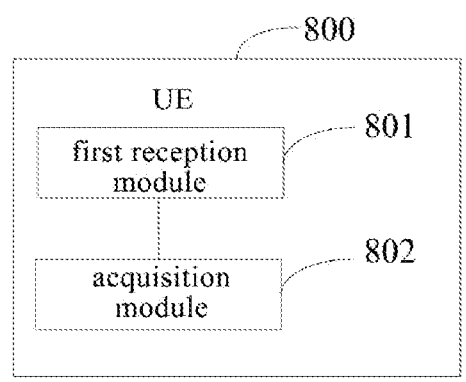
FIG. 8 is a schematic view showing a UE according to one embodiment of the present disclosure.

The present disclosure further provides in some embodiments a UE 800 which, as shown in FIG. 8, includes: a first reception module 801 configured to receive a first system message block from a base station, the first system message block including cell access related information and service indication information, the service indication information being used to indicate at least one of a service type supported by a cell and a new function of the first system message block, the service type including a service type in a first protocol release or including a service type in the first protocol release and a service type in a second protocol release, the new function being related to the second protocol release, and the second protocol release being an evolution release of the first protocol release; and an acquisition module 802 configured to, when the UE is a UE with the first protocol release, acquire the cell access related information, and when the UE is a UE with the second protocol release, acquire the service indication information.

In a possible embodiment of the present disclosure, the new function may include a new function of a target parameter in the cell access related information. The target parameter may include one or more of an SS block time index, a cell barred indicator, indication information about a position of a first DMRS for a PDSCH, a PRB grid offset, downlink numerology indication information, and configuration information about a CORESET.

In a possible embodiment of the present disclosure, the new function of the target parameter may include a function where the target parameter is used in both the first protocol release and the second protocol release, or a function where the target parameter is used in the second protocol release.

Figure 9:
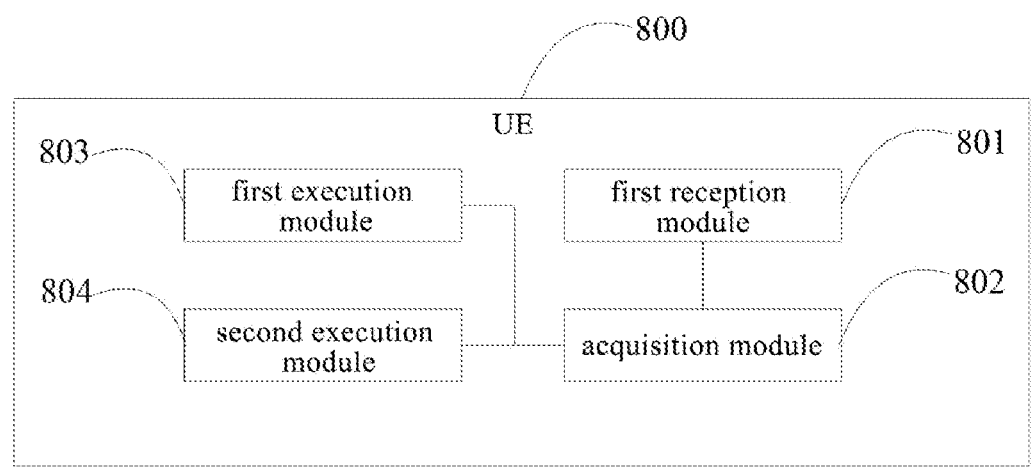
FIG. 9 is another schematic view showing the UE according to one embodiment of the present disclosure.

In a possible embodiment of the present disclosure, the UE may be a UE with the second protocol release. As shown in FIG. 9, the UE 800 may further include: a first execution module 803 configured to, when the target parameter is used in both the first protocol release and the second protocol release, acquire the target parameter, interpret the target parameter based on an interpretation in the second protocol release, and perform a corresponding operation based on the interpreting result; and a second execution module 804 configured to, when the target parameter is used in the second protocol release, ignore the cell barred indicator in the first system message block, acquire the target parameter, interpret the target parameter based on the interpretation in the second protocol release, acquire RMSI based on the interpreting result, and determine whether the UE is allowed to access the cell based on the cell barred indicator in the RMSI.

In a possible embodiment of the present disclosure, the service indication information may be at least used to indicate service types supported by the cell, and the UE may be a UE with the second protocol release.

Figure 10:
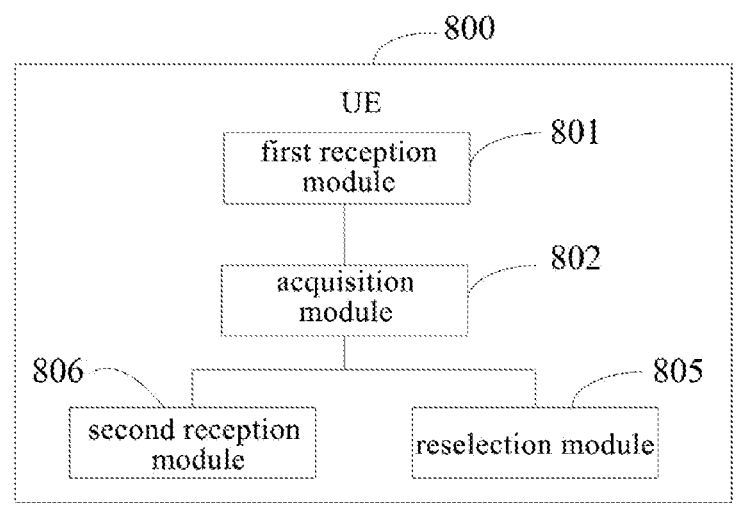
FIG. 10 is yet another schematic view showing the UE according to one embodiment of the present disclosure.

As shown in FIG. 10, the UE may further include: a reselection module 805 configured to, when the service types do not include a service type expected by the UE, perform cell reselection; or a second reception module 806 configured to, when the service types include the service type expected by the UE and there is a second system message block in the service type expected by the UE, receive the second system message block through a predetermined resource. At least a part of parameters of the second system message block is different from those in the first system message block, and the second system message block may include access related information about the service in the second protocol release.

In a possible embodiment of the present disclosure, the service indication information may be used to indicate at least one of the service type and the new function through K bits, where K is an integer greater than or equal to 2; or the service indication information may be used to indicate the service type through N bits, or indicate the new function through M bits, or indicate the service type and the new function through N bits and M bits respectively, where the N bits may be different from the M bits, N is an integer greater than or equal to 1, and M is an integer greater than or equal to 1.

The UE in the embodiments of the present disclosure is capable of implementing the procedures of the system message block transmission method for the UE in FIG. 4, which will not be particularly defined herein. According to the UE in the embodiments of the present disclosure, it is able to ensure the forward compatibility of the first system message block in the communication system.

Figure 11:
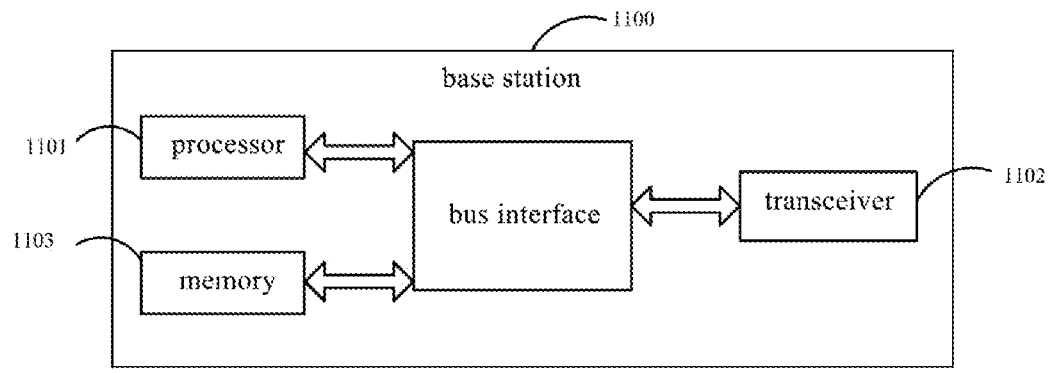
FIG. 11 is still yet another schematic view showing the base station according to one embodiment of the present disclosure.

The present disclosure further provides in some embodiments a base station 1100 which, as shown in FIG. 11, includes a processor 1101, a transceiver 1102, a memory 1103, and a bus interface. The processor 1101 is configured to generate a first system message block. The first system message block may include cell access related information and service indication information, the service indication information may be used to indicate at least one of a service type supported by a cell and a new function of the first system message block, the service type may include a service type in a first protocol release or include a service type in the first protocol release and a service type in a second protocol release, the new function may be related to the second protocol release, and the second protocol release may be an evolution release of the first protocol release. The transceiver 1102 is configured to transmit the first system message block.

In a possible embodiment of the present disclosure, the transceiver 1102 is further configured to, when the cell supports a service in the second protocol release, transmit a second system message block through a predetermined resource. At least a part of parameters of the second system message block is different from those in the first system message block, and the second system message block may include access related information about the service in the second protocol release.

In a possible embodiment of the present disclosure, the new function may include a new function of a target parameter in the cell access related information. The target parameter may include one or more of an SS block time index, a cell barred indicator, indication information about a position of a first DMRS for a PDSCH, a PRB grid offset, downlink numerology indication information, and configuration information about a CORESET.

In a possible embodiment of the present disclosure, the new function of the target parameter may include a function where the target parameter is used in both the first protocol release and the second protocol release, or a function where the target parameter is used in the second protocol release.

In a possible embodiment of the present disclosure, the processor 1101 is further configured to: when the target parameter is used in both the first protocol release and the second protocol release, perform a corresponding operation based on a interpreting result acquired through interpreting the target parameter in an interpretation in the first protocol release, and/or perform a corresponding operation based on a interpreting result acquired through interpreting the target parameter in an interpretation in the second protocol release; or when the target parameter is used in the second protocol release, perform the corresponding operation based on the interpreting result acquired through interpreting the target parameter in the interpretation in the second protocol release; or when the target parameter is used in the second protocol release, perform the corresponding operation based on the interpreting result acquired through interpreting the target parameter in the interpretation in the second protocol release, and perform the corresponding operation based on the interpreting result acquired through interpreting the target parameter in the interpretation in the first protocol release.

In a possible embodiment of the present disclosure, the cell access related information may include the cell barred indicator, and when the target parameter is used in the second protocol release, the cell barred indicator may be used to indicate that the cell is barred for a User Equipment (UE).

In a possible embodiment of the present disclosure, the service indication information may be used to indicate at least one of the service type and the new function through K bits, where K is an integer greater than or equal to 2; or the service indication information may be used to indicate the service type through N bits, or indicate the new function through M bits, or indicate the service type and the new function through N bits and M bits respectively, where the N bits may be different from the M bits, N is an integer greater than or equal to 1, and M is an integer greater than or equal to 1.

According to the base station in the embodiments of the present disclosure, it is able to ensure the forward compatibility of the first system message block in the communication system.

The transceiver 1102 is configured to receive and transmit data under the control of the processor 1101, and it may include at least two antenna ports.

In FIG. 11, bus architecture may include a number of buses and bridges connected to each other, so as to connect various circuits for one or more processors 1101 and one or more memories 1103. In addition, as is known in the art, the bus architecture may be used to connect any other circuits, such as a circuit for a peripheral device, a circuit for a voltage stabilizer and a power management circuit. The bus interface may be provided, and the transceiver 1102 may consist of a plurality of elements, i.e., a transmitter and a receiver for communication with any other devices over a transmission medium. With respect to different UEs, a user interface may also be provided for devices which are to be arranged inside or outside the UE, and these devices may include but not limited to a keypad, a display, a speaker, a microphone and a joystick. The processor 1101 may take charge of managing the bus architecture as well as general processings. The memory 1103 may store therein data for the operation of the processor 1101.

The present disclosure further provides in some embodiments a base station, including a processor 1101, a memory 1103, and a computer program stored in the memory 1103 and executed by the processor 1101. The computer program is executed by the processor 1101 so as to implement the above-mentioned system message block transmission method with a same technical effect, which will not be particularly defined herein.

Figure 12:
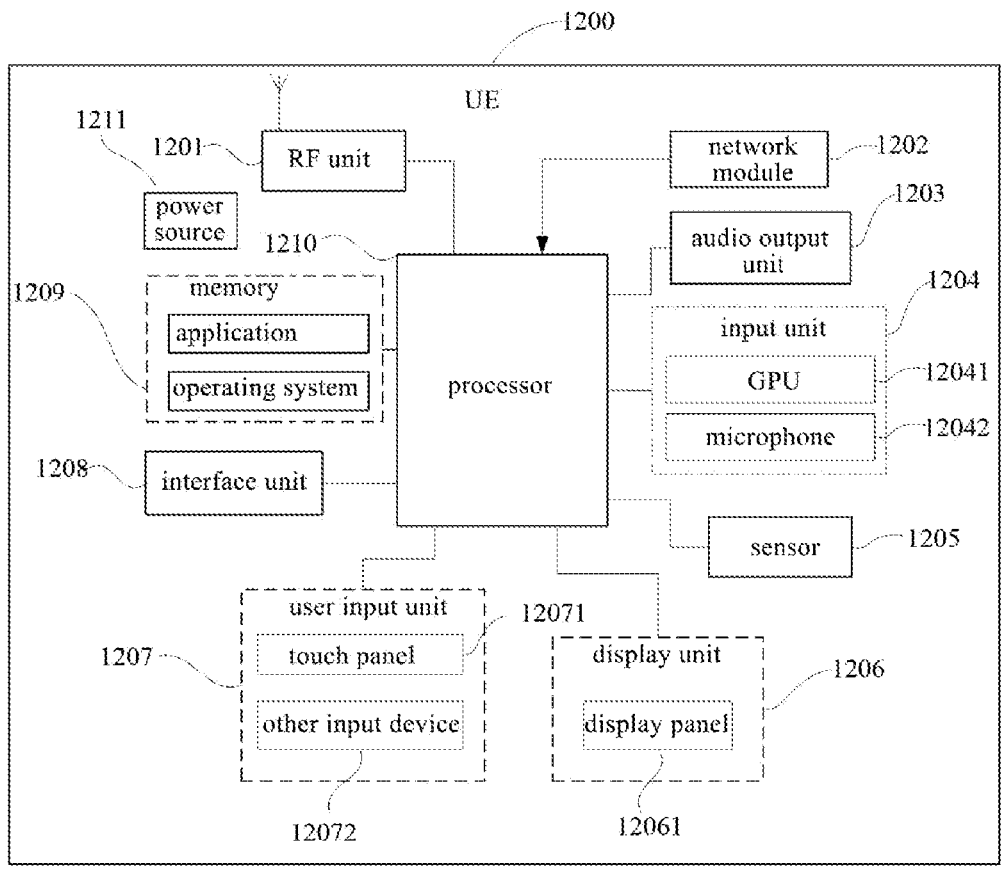
FIG. 12 is still yet another schematic view showing the UE according to one embodiment of the present disclosure.

As shown in FIG. 12, the present disclosure further provides in some embodiments a UE 1200 which includes, but not limited to, a Radio Frequency (RF) unit 1201, a network module 1202, an audio output unit 1203, an input unit 1204, a sensor 1205, a display unit 1206, a user input unit 1207, an interface unit 1208, a memory 1209, a processor 1210, and a power source 1211. It should be appreciated that, the structure in FIG. 12 shall not be construed as limiting the UE. The UE may include more or fewer members, or some members may be combined, or the UE may include some other members not shown in FIG. 16. In the embodiments of the present disclosure, the UE may include, but not limited to, mobile phone, flat-panel computer, laptop computer, Personal Digital Assistant (PDA), vehicle-mounted terminal, wearable device or pedometer.

The RF unit 1201 is configured to receive a first system message block from a base station. The first system message block may include cell access related information and service indication information, the service indication information may be used to indicate at least one of a service type supported by a cell and a new function of the first system message block, the service type may include a service type in a first protocol release or include a service type in the first protocol release and a service type in a second protocol release, the new function may be related to the second protocol release, and the second protocol release may be an evolution release of the first protocol release. The processor 1210 is configured to, when the UE is a UE with the first protocol release, acquire the cell access related information, and when the UE is a UE with the second protocol release, acquire the service indication information.

In a possible embodiment of the present disclosure, the new function may include a new function of a target parameter in the cell access related information. The target parameter may include one or more of an SS block time index, a cell barred indicator, indication information about a position of a first DMRS for a PDSCH, a PRB grid offset, downlink numerology indication information, and configuration information about a CORESET.

In a possible embodiment of the present disclosure, the new function of the target parameter may include a function where the target parameter is reused in both the first protocol release and the second protocol release, or a function where the target parameter is used in the second protocol release.

In a possible embodiment of the present disclosure, the UE may be a UE with the second protocol release. Subsequent to acquiring the service indication information, the processor 1210 is further configured to: when the target parameter is reused in both the first protocol release and the second protocol release, acquire the target parameter, interpret the target parameter based on an interpretation in the second protocol release, and perform a corresponding operation based on the interpreting result; and when the target parameter is used in the second protocol release, ignore the cell barred indicator in the first system message block, acquire the target parameter, interpret the target parameter based on the interpretation in the second protocol release, acquire RMSI based on the interpreting result, and determine whether the UE is allowed to access the cell based on the cell barred indicator in the RMSI.

In a possible embodiment of the present disclosure, the service indication information may be at least used to indicate service types supported by the cell, and the UE may be a UE with the second protocol release.

Subsequent to acquiring the service indication information, the processor 1210 is further configured to: when the service types do not include a service type expected by the UE, perform cell reselection; or when the service types include the service type expected by the UE and there is a second system message block in the service type expected by the UE, receive the second system message block through a predetermined resource. At least a part of parameters of the second system message block is different from those in the first system message block, and the second system message block may include access related information about the service in the second protocol release.

In a possible embodiment of the present disclosure, the service indication information may be used to indicate at least one of the service type and the new function through K bits, where K is an integer greater than or equal to 2; or the service indication information may be used to indicate the service type through N bits, or indicate the new function through M bits, or indicate the service type and the new function through N bits and M bits respectively, where the N bits may be different from the M bits, N is an integer greater than or equal to 1, and M is an integer greater than or equal to 1.

According to the UE in the embodiments of the present disclosure, it is able to ensure the forward compatibility in the communication system.

It should be appreciated that, in the embodiments of the present disclosure, the RF unit 1201 is configured to transmit and receive signals during the information transmission or phone call. To be specific, the RF unit 1201 may, upon the receipt of downlink data from a base station, transmit the downlink data to the processor 1210 for subsequent processing. In addition, the RF unit 1201 may transmit uplink data to the base station. Usually, the RF unit 161 may include, but not limited to, an antenna, at least one amplifier, a transceiver, a coupler, a low-noise amplifier and a duplexer. In addition, the RF unit 1201 may communicate with a network and the other devices via a wireless communication system.

The network module 1202 is configured to enable the UE to access the broadband Internet in a wireless manner, e.g., help a user to receive and send an e-mail, browse a web page or access a streaming media.

The audio output unit 1203 is configured to convert audio data received by the RF unit 1201 or the network module 1202, or audio data stored in the memory 1209, into an audio signal and output the audio signal as a sound. In addition, the audio output unit 1203 is further configured to provide an audio output related to a specific function executed by the UE 1200 (e.g., a sound occurring when a calling signal or a message has been received). The audio output unit 1203 may include a loudspeaker, a buzzer and a receiver.

The input unit 1204 is configured to receive an audio or video signal. It may include a Graphics Processing Unit (GPU) 12041 and a microphone 12042. The GPU 12041 is configured to process image data of a static image or video acquired by an image collection unit (e.g., a camera) in a video capturing mode or an image capturing mode, and a processed image frame may be displayed by the display unit 1206. The image frame processed by the GPU 12041 may be stored in the memory 1209 (or any other storage medium) or transmitted via the RF unit 1201 or network module 1202. The microphone 12042 is configured to receive a sound, and convert the sound into voice data. In a call mode, the processed audio data may be converted into data in a format capable of being transmitted by the RF unit 1201 to a mobile communication base station.

The at least one sensor 1205 may include a light sensor, a movement sensor and the other sensors. To be specific, the light sensor may include an ambient light sensor or a proximity sensor. The ambient light sensor is configured to adjust a brightness value of a display panel 12061 based on ambient light. The proximity sensor is configured to turn off the display panel 12061 and/or a backlight source when the UE 1200 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the UE (e.g., perform a switching operation between portrait and landscape orientations, play relevant games, and calibrate a posture of a magnetometer), and perform vibration-related functions (e.g., count steps and strikes). The sensor 1205 may further include a fingerprint sensor, a pressure sensor, an iris sensor, a molecule sensor, a gyroscope, a barometer, a hygrometer, a thermometer or an infrared sensor, which will not be particularly defined herein.

The display unit 1206 is configured to display information inputted by the user or provided to the user. The display unit 1206 may include the display panel 12061, e.g., a Liquid Crystal Display (LCD) panel, or an Organic Light-Emitting Diode (OLED) panel.

The user input unit 1207 is configured to receive digital or character information inputted by the user, and generate a key signal input related to user settings and function control of the UE. To be specific, the user input unit 1207 may include a touch panel 12071 and an input device 12072. The touch panel 12071, also called as touch screen, is configured to collect a touch operation made by the user on or in proximity to the touch panel (e.g., an operation made by the user through any appropriate object or attachment (e.g., finger or stylus) on or in the proximity to the touch panel 12071). The touch panel 12071 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 1210, and receive and execute a command from the processor 1210. In addition, the touch panel 12071 may be of a resistive type, a capacitive type, an infrared type or a surface acoustic wave (SAW) type. The other input device 12072 may include, but not limited to, a physical keyboard, a functional button (e.g., a volume control button or an on/off button), a trackball, a mouse, and a joystick, which will not be particularly defined herein.

Further, the touch panel 12071 may cover the display panel 12061. When the touch operation made on or in proximity to the touch panel 12071 has been detected, the touch panel 12071 may transmit the touch information to the processor 1210, so as to determine a type of a touch event. Then, the processor 1210 may control the display panel 12061 to provide a corresponding visual output based on the type of the touch event. Although the touch panel 12071 and the display panel 12061 are configured as two separate members in FIG. 12, in some embodiments of the present disclosure, they may be integrated so as to achieve the input and output functions of the electronic device, which will not be particularly defined herein.

The interface unit 1208 is configured to provide an interface between an external device and the UE 1200. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 1208 is configured to receive an input from the external device (e.g., data information and electricity) and transmit the input to one or more elements of the UE 1200, or transmit data between the UE 1200 and the external device.

The memory 1209 is configured to store therein a software application and various data. It may mainly include an application storage area and a data storage area. An operating system and at least one application for the functions (e.g., an audio/image playing function) may be stored in the application storage area. Data created based on the operation of the mobile phone (e.g., audio data and textbook) may be stored in the data storage area. In addition, the memory 1209 may include a high-speed random access memory (RAM), or a non-volatile memory (e.g., at least one magnetic disk or flash memory), or any other volatile solid state memory.

As a control center of the electronic device, the processor 1210 may be connected to the other members of the electronic device via various interfaces and circuits, and configured to run or execute the software program and/or module stored in the memory 1209, and call the data stored in the memory 1209, so as to execute the functions of the electronic device and process the data, thereby to monitor the entire electronic device. The processor 1210 may include one or more processing units. In a possible embodiment of the present disclosure, an application processor and a modem may be integrated into the processor 1210. The application processor is mainly configured to process the operating system, a user interface and the application. The modem is mainly configured to process wireless communication. It should be appreciated that, the modem may also not be integrated into the processor 1210.

The power source 1211 (e.g., a battery) is configured to supply power to the members of the UE 1200. In a possible embodiment of the present disclosure, the power source 1211 is logically connected to the processor 1210 via a power source management system, so as to achieve such functions as charging, discharging and power consumption management through the power source management system.

In addition, the UE 1200 may include some functional modules not shown in FIG. 12, which will not be particularly defined herein.

The present disclosure further provides in some embodiments a UE which includes a processor 1210, a memory 1209, and a computer program stored in the memory 1209 and executed by the processor 1210. The computer program is executed by the processor 1210 so as to implement the above-mentioned system message block transmission method with a same technical effect, which will not be particularly defined herein.

The present disclosure further provides in some embodiments a computer-readable storage medium storing therein a computer program. The computer program is executed by a processor so as to implement the above-mentioned system message block transmission method for the base station, or the above-mentioned system message block transmission method for the UE, which will not be particularly defined herein. The computer-readable storage medium may be an ROM, an RAM, a magnetic disk or an optical disk.

It should be appreciated that, in the context, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A system message block transmission method performed by a base station, comprising:
   generating a first system message block, wherein the first system message block comprises cell access related information and service indication information, the service indication information is used to indicate at least one of a service type supported by a cell and a new function of the first system message block, the service type comprises a service type in a first protocol release, or the service type comprises a service type in the first protocol release and a service type in a second protocol release, the new function is related to the second protocol release, and the second protocol release is an evolution release of the first protocol release; and
   transmitting the first system message block;
   wherein the new function comprises a new function of a target parameter in the cell access related information, and the target parameter comprises at least one of a Synchronization Signal (SS) block time index, a cell barred indicator, indication information about a position of a first Demodulation Reference Signal (DMRS) for a Physical Downlink Shared Channel (PDSCH), a Physical Resource Block (PRB) grid offset, downlink numerology indication information, or configuration information of a Control Resource Set (CORESET).

2. The system message block transmission method according to claim 1, further comprising:
   subsequent to the generating the first system message block, when the cell supports a service in the second protocol release, transmitting a second system message block through a predetermined resource, wherein at least a part of parameters of the second system message block are different from the first system message block, and the second system message block comprises access related information about the service in the second protocol release.

3. The system message block transmission method according to claim 1, wherein the target parameter is used in both the first protocol release and the second protocol release, or the target parameter is used in the second protocol release.

4. The system message block transmission method according to claim 3, further comprising: subsequent to transmitting the first system message block:
   when the target parameter is used in both the first protocol release and the second protocol release, performing a corresponding operation based on a interpreting result acquired through interpreting the target parameter in an interpretation in the first protocol release, and/or performing a corresponding operation based on a interpreting result acquired through interpreting the target parameter in an interpretation in the second protocol release; or
   when the target parameter is used in the second protocol release, performing the corresponding operation based on the interpreting result acquired through interpreting the target parameter in the interpretation in the second protocol release; or when the target parameter is used in the second protocol release, performing the corresponding operation based on the interpreting result acquired through interpreting the target parameter in the interpretation in the second protocol release, and performing the corresponding operation based on the interpreting result acquired through interpreting the target parameter in the interpretation in the first protocol release.

5. The system message block transmission method according to claim 3, wherein the cell access related information comprises the cell barred indicator, and when the target parameter is used in the second protocol release, the cell barred indicator is used to indicate that the cell is barred for a User Equipment (UE).

6. The system message block transmission method according to claim 1, wherein the service indication information is used to indicate at least one of the service type and the new function through K bits, where K is an integer greater than or equal to 2; or the service indication information is used to indicate the service type through N bits, or indicate the new function through M bits, or indicate the service type and the new function through N bits and M bits respectively, where the N bits are different from the M bits, N is an integer greater than or equal to 1, and M is an integer greater than or equal to 1.

7. The system message block transmission method according to claim 1, wherein the service indication information is indicated through an unused bit in a system message block defined in the first protocol release.

8. A system message block transmission method performed by a UE, comprising:

receiving a first system message block from a base station, wherein the first system message block comprises cell access related information and service indication information, the service indication information is used to indicate at least one of a service type supported by a cell and a new function of the first system message block, the service type comprises a service type in a first protocol release, or the service type comprises a service type in the first protocol release and a service type in a second protocol release, the new function is related to the second protocol release, and the second protocol release is an evolution release of the first protocol release; and when the UE is a UE with the first protocol release, acquiring the cell access related information, or when the UE is a UE with the second protocol release, acquiring the service indication information;

wherein the new function comprises a new function of a target parameter in the cell access related information, and the target parameter comprises one or more of an SS block time index, a cell barred indicator, indication information about a position of a first DMRS for a PDSCH, a PRB grid offset, downlink numerology indication information, or configuration information about a CORESET.

9. The system message block transmission method according to claim 8, wherein the target parameter is used in both the first protocol release and the second protocol release, or the target parameter is used in the second protocol release.

10. The system message block transmission method according to claim 9, wherein the UE is a UE with the second protocol release, subsequent to acquiring the service indication information, the system message block transmission method further comprises:

when the target parameter is used in both the first protocol release and the second protocol release, acquiring the target parameter, interpreting the target parameter based on an interpretation in the second protocol release, and performing a corresponding operation based on the interpreting result; or when the target parameter is used in the second protocol release, ignoring the cell barred indicator in the first system message block, acquiring the target parameter, interpret the target parameter based on the interpretation in the second protocol release, acquiring Remaining Minimum System Information (RMSI) based on the interpreting result, and determining whether the UE is allowed to access the cell based on the cell barred indicator in the RMSI.

11. The system message block transmission method according to claim 8, wherein the service indication information is at least used to indicate service types supported by the cell, and the UE is a UE with the second protocol release, subsequent acquiring the service indication information, the system message block transmission method further comprises:

when the service types do not comprise a service type expected by the UE, performing cell reselection; or when the service types comprise the service type expected by the UE, receiving the second system message block through a predetermined resource, wherein at least a part of parameters of the second system message block are different from the first system message block, and the second system message block comprises access related information about the service in the second protocol release.

12. The system message block transmission method according to claim 8, wherein the service indication information is used to indicate at least one of the service type and the new function through K bits, where K is an integer greater than or equal to 2; or the service indication information is used to indicate the service type through N bits, or indicate the new function through M bits, or indicate the service type and the new function through N bits and M bits respectively, wherein the N bits are different from the M bits, N is an integer greater than or equal to 1, and M is an integer greater than or equal to 1.

13. The system message block transmission method according to claim 8, wherein the service indication information is indicated through an unused bit in a system message block defined in the first protocol release.

14. A UE, comprising a memory, a processor, and a computer program stored in the memory and executed by the processor, wherein the processor is configured to execute the computer program so as to implement a system message block transmission method, the system message block transmission method comprises:

receiving a first system message block from a base station, wherein the first system message block comprises cell access related information and service indication information, the service indication information is used to indicate at least one of a service type supported by a cell and a new function of the first system message block, the service type comprises a service type in a first protocol release, or the service type comprises a service type in the first protocol release and a service type in a second protocol release, the new function is related to the second protocol release, and the second protocol release is an evolution release of the first protocol release; and when the UE is a UE with the first protocol release, acquiring the cell access related information, or when the UE is a UE with the second protocol release, acquiring the service indication information;

wherein the new function comprises a new function of a target parameter in the cell access related information, and the target parameter comprises one or more of an SS block time index, a cell barred indicator, indication information about a position of a first DMRS for a PDSCH, a PRB grid offset, downlink numerology indication information, or configuration information about a CORESET.

15. The UE according to claim 14, wherein the target parameter is used in both the first protocol release and the second protocol release, or the target parameter is used in the second protocol release.

16. The UE according to claim 15, wherein the UE is a UE with the second protocol release, subsequent to acquiring the service indication information, the processor is configured to:

when the target parameter is used in both the first protocol release and the second protocol release, acquire the target parameter, interpret the target parameter based on an interpretation in the second protocol release, and perform a corresponding operation based on the interpreting result; or when the target parameter is used in the second protocol release, ignore the cell barred indicator in the first system message block, acquire the target parameter, interpret the target parameter based on the interpretation in the second protocol release, acquire Remaining Minimum System Information (RMSI) based on the interpreting result, and determine whether the UE is allowed to access the cell based on the cell barred indicator in the RMSI.

17. The UE according to claim 14, wherein the service indication information is at least used to indicate service types supported by the cell, and the UE is a UE with the second protocol release, subsequent acquiring the service indication information, the system message block transmission method further comprises:

when the service types do not comprise a service type expected by the UE, performing cell reselection; or when the service types comprise the service type expected by the UE, receiving the second system message block through a predetermined resource, wherein at least a part of parameters of the second system message block are different from the first system message block, and the second system message block comprises access related information about the service in the second protocol release.

18. The UE according to claim 14, wherein the service indication information is used to indicate at least one of the service type and the new function through K bits, where K is an integer greater than or equal to 2; or the service indication information is used to indicate the service type through N bits, or indicate the new function through M bits, or indicate the service type and the new function through N bits and M bits respectively, wherein the N bits are different from the M bits, N is an integer greater than or equal to 1, and M is an integer greater than or equal to 1.

19. The UE according to claim 14, wherein the service indication information is indicated through an unused bit in a system message block defined in the first protocol release.

* * * * *